United States Patent [19]
Hirohata

[11] Patent Number: 5,410,379
[45] Date of Patent: Apr. 25, 1995

[54] CAMERA USING VARIABLE MAGNIFICATION PHOTOGRAPHIC OPTICAL SYSTEM UNIT

[75] Inventor: Michio Hirohata, Yokohama, Japan

[73] Assignee: Canon Kabushiki Kaisha, Tokyo, Japan

[21] Appl. No.: 958,158

[22] Filed: Oct. 9, 1992

[30] Foreign Application Priority Data

Oct. 22, 1991 [JP] Japan ................................. 3-301237
Jan. 8, 1992 [JP] Japan ................................. 4-018373

[51] Int. Cl.⁶ ..................... G03B 3/00; G03B 13/10; G03B 15/03
[52] U.S. Cl. ..................... 354/199; 354/222; 354/149.1
[58] Field of Search ............... 354/199, 200, 201, 222, 354/149.1

[56] References Cited

U.S. PATENT DOCUMENTS

| | | | |
|---|---|---|---|
| 3,882,520 | 5/1975 | Kamp et al. | 354/199 |
| 4,072,971 | 2/1978 | Kuboshima | 354/199 X |
| 5,068,678 | 11/1991 | Mogamiya et al. | 354/199 |
| 5,083,146 | 1/1992 | Ueda | 354/149.1 |
| 5,083,149 | 1/1992 | Kudo et al. | 354/199 X |
| 5,162,831 | 11/1992 | Haraguchi et al. | 354/199 X |

FOREIGN PATENT DOCUMENTS 54-50324  4/1979  Japan.
63-2030   1/1988  Japan.
0248933   2/1990  Japan.

Primary Examiner—Michael L. Gellner
Assistant Examiner—Jae N. Noh
Attorney, Agent, or Firm—Fitzpatrick, Cella, Harper & Scinto

[57] ABSTRACT

A camera using a variable magnification photographic optical unit, or an apparatus for such a camera, includes a follower portion for following a magnification varying operation of the variable magnification photographic optical unit, a driving portion for driving a flash unit or a finder in accordance with the magnification varying operation of the variable magnification photographic optical unit, and an interlocking portion, rotatably supported around a supporting portion, for joining the follower portion and the driving portion and for arranging the supporting portion, the follower portion, and the driving portion in such a manner so as to be substantially in a straight line.

150 Claims, 5 Drawing Sheets

CAMERA USING VARIABLE MAGNIFICATION PHOTOGRAPHIC OPTICAL SYSTEM UNIT

BACKGROUND OF THE INVENTION

1. Field of the Invention

The present invention relates to a camera using a variable magnification photographic optical system, and more particularly, to an improvement in an interlocking relationship between the variable magnification photographic optical system and another optical device.

2. Description of the Related Art

A conventional zoom lens provided camera, as disclosed in Japanese Patent Laid-Open No. 2030/1988, is arranged in such a manner that a gear portion is provided for a zoom ring, rotation power around an optical axis is transmitted through the gear portion to a cam board that moves an electric flash unit and a finder, a sideways movement of the cam board moves a light emitting portion of the electric flash unit and a lens of the finder.

A conventional camera of this type, wherein the driving power for the electric flash unit and the finder is obtained from the cam ring rotating around the optical axis, must have a means for rotating the cam ring on the body, i.e. the fixed side. Thus, there is the disadvantage that the body side becomes short of space. Further, because of the arrangement restriction that the ring at the outermost portion of a lens barrel transmits the driving power to the electric flash unit and the finder and that a partial protrusion of the gear mechanism for transmitting the above-described driving power is necessary, the conventional camera has the disadvantages of requiring a complicated light-shield for the lens barrel as well as a space for accommodating the light shield.

In addition, owing to such mechanical restrictions, the sliding amount between a cam, integrated with a cam ring, for an electric flash unit and an interlocking member, which is disclosed in Japanese Patent Laid-Open No. 50324/79 and Japanese Utility Model Laid-Open No. 48933/90, and the sliding amount between a cam board of an electric flash unit and a flash unit member, which is disclosed in Japanese patent No. 2030/88, become large relative to the moving stroke action, so that these cams wear out quickly. Further, driving a finder lens through a large amount of cam sliding results in the finder lens being susceptible to vibration under the influence of friction of the cam, thus leading to an image vibration in the finder, etc. In order to prevent this problem, it is necessary to improve the precision of the mechanism, etc., thus resulting in deterioration of both the cost and space aspects of the conventional camera.

In particular, speed reduction and connection by means of a large number of gears, such as is disclosed in Japanese Patent Laid-Open No. 2030/1988, causes the number of components to increase, the mechanism to be complicated, and the positioning operation, etc., to be aggravated, resulting in degraded assembly characteristics.

SUMMARY OF THE INVENTION

One aspect of the present invention is to provide a camera using a variable magnification photographic optical system, or an apparatus for such a camera, which comprises a follower portion for following a magnification varying operation of the variable magnification photographic optical system, a driving portion for driving a flash unit or a finder in accordance with the magnification varying operation of the variable magnification photographic optical system, and an interlocking portion, to be rotatably supported around a supporting portion for arranging the supporting portion, the follower portion and the driving portion disposed in such a manner as to be substantially in a straight line, whereby the above-described problems are eliminated, and the variable magnification photographic optical system and the flash unit or the finder can be interlocked with a simple construction without using a rotating cam ring.

Other aspects of the present invention will become apparent from the following description of the preferred embodiments of the present invention.

DETAILED DESCRIPTION OF THE PREFERRED EMBODIMENTS

Preferred embodiments of the present invention will now be described with reference to the accompanying drawings.

FIGS. 1 through 5 show a first preferred embodiment of the present invention.

Figure 1:
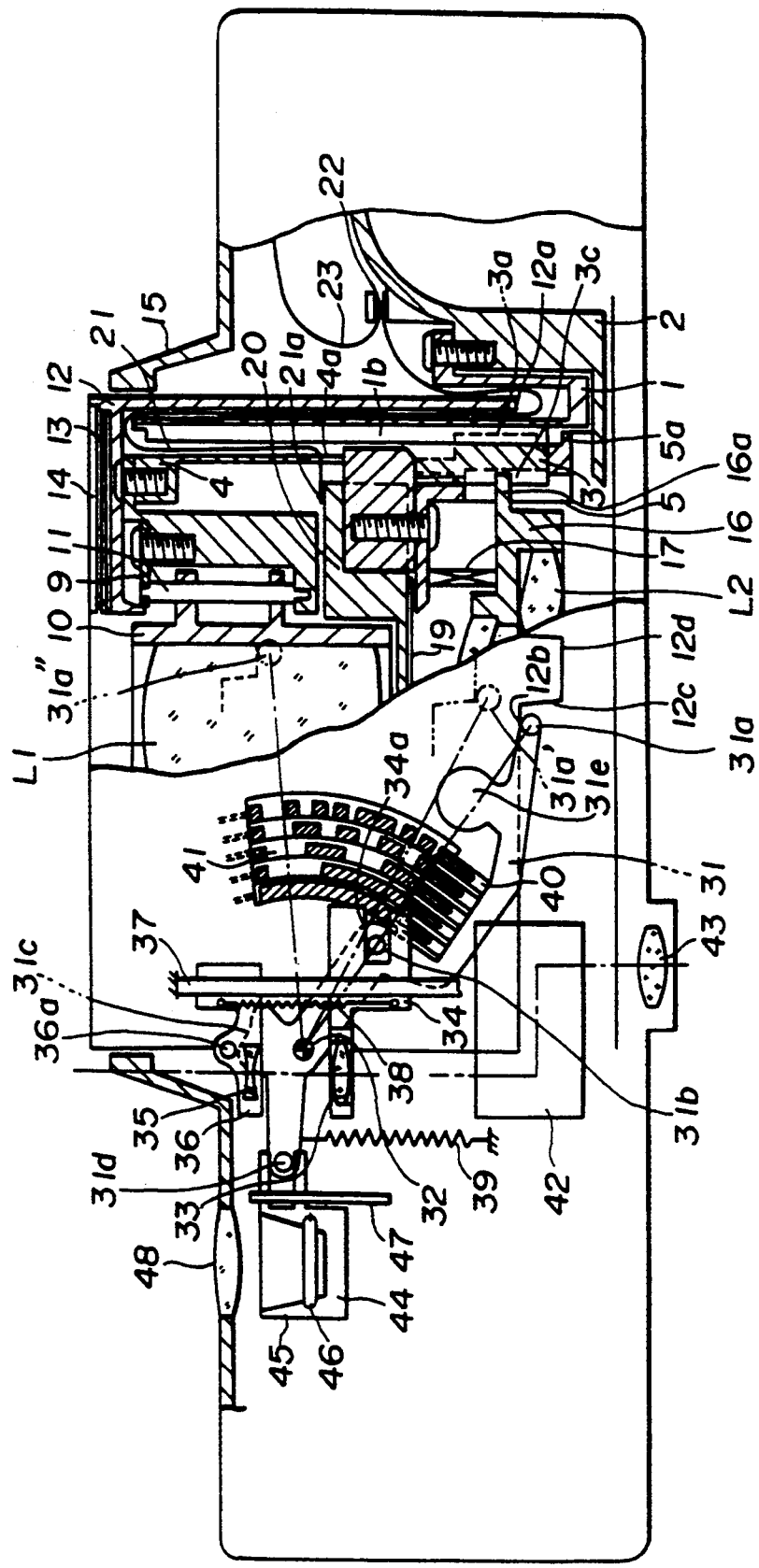
FIG. 1 is a partially cut away construction diagram, with an essential part cut away of a zoom lens provided camera in accordance with a first preferred embodiment of the present invention.
Figure 2:
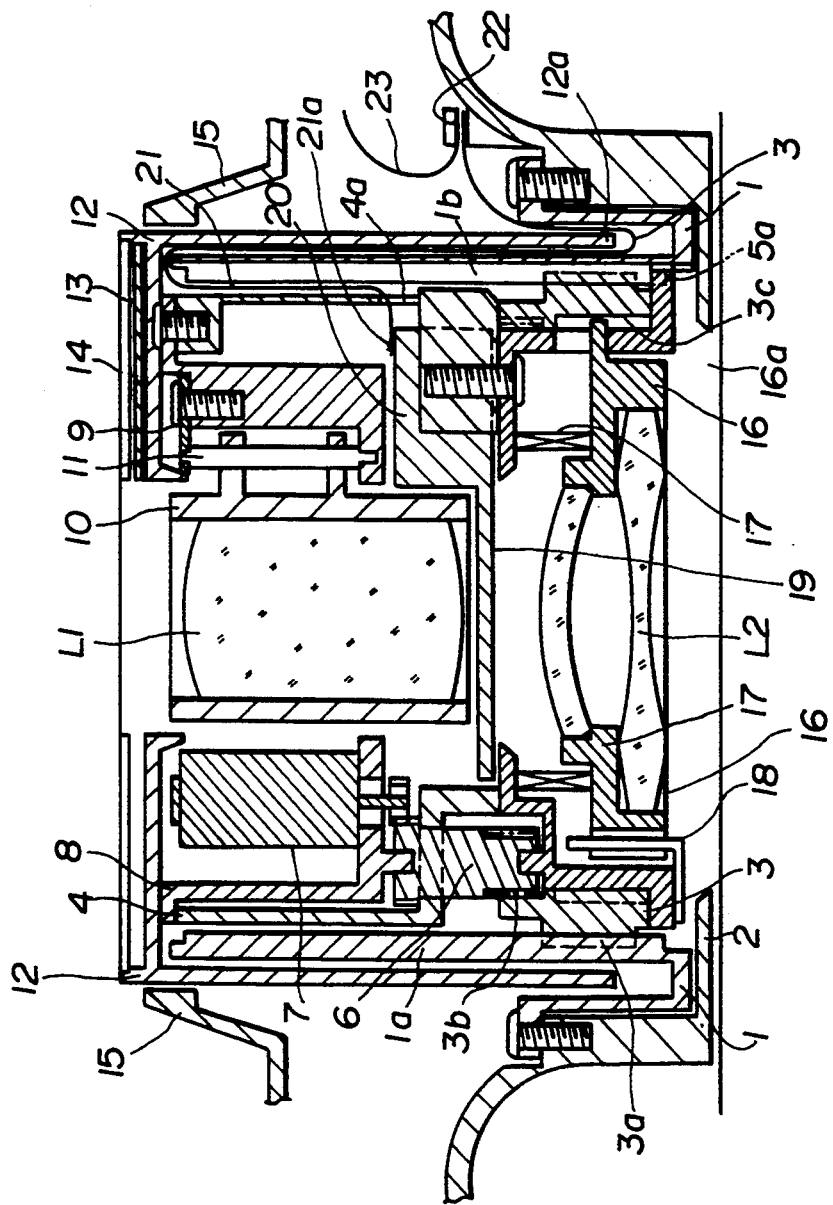
FIG. 2 is a sectional view of a lens barrel of the camera of FIG. 1.
Figure 3:
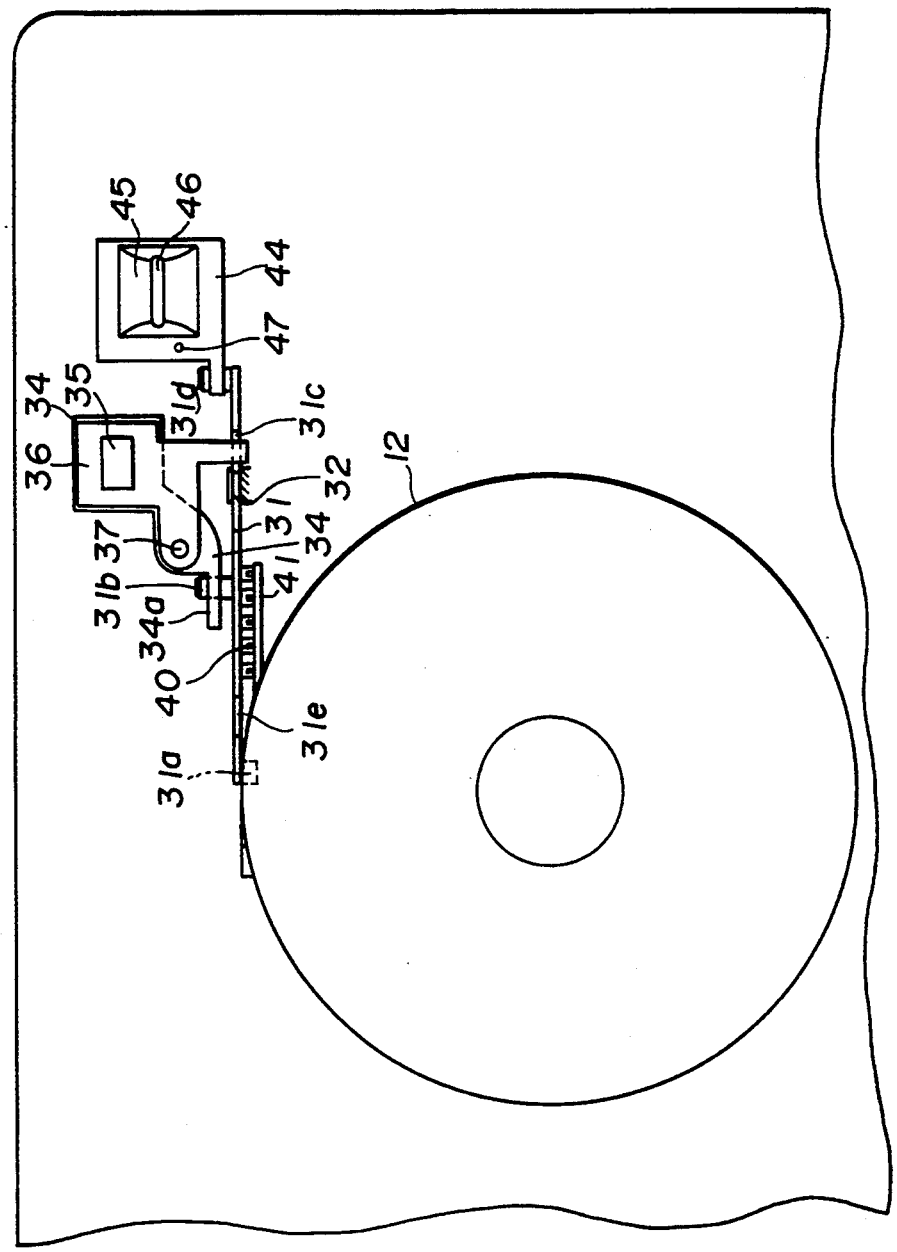
FIG. 3 is a front view of an essential construction of the camera of FIG. 1.

Referring to FIGS. 1 through 3, reference numeral 1 denotes a fixed lens barrel fixed to a camera body 2 in such a manner as to obtain sufficient light-shielding. Inside the fixed lens barrel 1, a triple thread female helicoid 1a, and a slot 1b parallel with a photographic optical axis are provided. Reference numeral 3 denotes a cam barrel located between an upper baseboard 4 and a lower baseboard 5, and rotatably coupled with the lower baseboard 5. A male helicoid 3a, provided around an outer surface portion of the cam barrel 3, meshes with the female helicoid 1a of the fixed lens barrel 1. The lower baseboard 5 is provided with a key 5a fitting in a key seat 1b of the fixed lens barrel, wherein the lower baseboard 5 moves straight along the photographic optical axis upon rotation of the cam barrel 3. Furthermore, an inner gear 3b formed around an inner surface portion of the cam barrel 3 is connected with a zoom motor 7 through a reduction gear 6, whereby rotation of the zoom motor 7 rotates the cam barrel 3.

On the other hand, the lower baseboard 5 is fixed to a rear edge face of the upper baseboard 4 with a screw, and an automatic focusing (AF) baseboard 8 is fixed to a front edge face of the upper baseboard 4 with a screw. A shutter unit 20 including shutter blades 19 is accommodated between the lower baseboard 5 and the AF baseboard 8. An AF mechanism 8 including an AF motor (not shown) and a first lens group holder 10 holding the first lens group L1 for zooming are accommodated between the AF baseboard 8 and a fixing board 9 fixed to the AF baseboard 8 with a screw. Reference numeral 11 denotes a guide bar for supporting the first lens group holder 10 in such a manner as to be capable of moving along the photographic axis in order to focus.

Reference numeral 12 denotes an outer lens barrel that is located outside the fixed lens barrel 1, keeps overlapping with the fixed lens barrel, and becomes an exterior framework at the time of movement during a zooming operation. In addition, the outer lens barrel 12 is fixed to the upper baseboard 4 together with the AF baseboard 8 with a screw. Thus, the outer lens barrel moves straight relative to the fixed lens barrel 1 upon rotation of the cam barrel 3.

Reference numeral 13 denotes a lens barrier arranged between the outer lens barrel 12 and a barrier cover 14.

A lens barrel cover 15 fixed to the camera body 2 is provided outside the outer lens barrel 12 so as to always overlap with the outer lens barrel 12 even if the outer lens barrel 12 moves by zooming. As a result, a double overlapping of the outer lens barrel 12 and the lens barrel cover 15, and the outer lens barrel 12 and the fixed lens barrel 1 is provided, thereby preventing the leakage of light, even during a great deal of zoom movement.

Next, regarding the zoom construction, three second lens group cams 3c are provided on the cam barrel 3, a follower 16a of a holder 16 of the second lens group L2 is pressed on the second lens group cams 3c by an urging force of a spring 17, and the cam barrel 3 is prohibited from rotating by a key 18 relative to the lower baseboard 5. Therefore, when the holder 16 moves straight along the photographic axis relative to the lower baseboard 5 upon rotation of the cam barrel 3, a space between the first lens group L1 and the second lens group L2 is changed, and also the first and second lens group L1 and L2 are moved straight as a whole by the amount of lead of the female helicoid 1a of the fixed lens barrel 1, thus performing a movement of a two lens groups type zoom lens, wherein the front lens group L1 is a convex one and the rear lens group L2 is a concave one.

The shutter unit 20 is composed of an electromagnetic driving shutter that is driven by supplying electricity and is connected to an electric control circuit of the camera body 2 through a flexible printed circuit board 21. This flexible printed circuit board 21 is connected to the shutter unit 20 at a soldering portion 21a, passes through an opening 4a of the upper baseboard 4, passes between the fixed lens barrel 1 and the upper baseboard 4, goes around a front edge of the fixed lens barrel 1 and a rear edge 12a of the outer lens barrel 12 at the time of moving close to the camera body 2, is led to a connector 22 on the camera body 2 and is electrically connected to a flexible printed board 23 on the side of the camera body 2.

Next, regarding an interlocking mechanism of an electric flash unit and a finder unit, a zoom interlocking lever 31 is supported on the camera body 2 or a baseboard fixed to the camera body 2 in such a manner as to be capable of rotating about a shaft 32. A cam follower 31a provided on one end of the zoom interlocking lever 31 is urged counterclockwise in FIG. 1 by means of a spring 39 in such a manner as to successively slide on and keep contact with an accommodating cam portion 12b, a collapsing cam portion 12c and an interlocking cam portion 12d, which are formed on the rear edge face of the outer lens barrel 12, in accordances with the movement of the outer lens barrel 12.

When the follower 31a is at a maximum wide angle position, where the follower 31a is depicted by a dot-dash chain line 31a', the follower 31a is on the interlocking cam portion 12d, and when the follower 31a is also at a maximum telephoto position, where the follower 31a is shown in a broken line 31a'', the follower 31a is on the interlocking cam portion 12d. That is, the follower 31a is arranged to slide on the interlocking cam portion 12d during zooming.

In addition, the zoom interlocking lever 31 has a finder driving pin 31b and a finder first lens group cam 31c. The finder driving pin 31b engages with a slot 34a of a holder 34 of a finder second lens group 33. The finder first lens group cam 31c engages with a follower pin 36a provided on a holder 36 of a finder first lens group 35, so that the finder first lens group 35 is slightly moved along the photographic axis to compensate in order to keep the finder clear.

Further, the holder 36 of the finder first lens group 35 and the holder 34 of the finder second lens group 33 are arranged to move straight under the guidance of a guide 37 provided on the camera body 2 or a baseboard fixed to the camera body 2. Also, the finder lenses 35 and 33 bias each other by a spring 38 hung between the holder 36 and the holder 34 to correctly position the lenses.

While the outer lens barrel 12 is moved to a position corresponding to zooming from the maximum wide angle position to the maximum telephoto position, the follower 31a of the zoom interlocking lever 31 slides on the interlocking cam portion 12d of the outer lens barrel 12 from the position of the follower 31a' to the position of the follower 31a''. Since the shaft 32, the finder driving pin 31b and the follower 31a are arranged to be in a straight line, y/x=b/a, wherein a movement amount of the first lens group L1 of the photographic lens from the maximum wide angle position to the maximum telephoto position is x (i.e., a movement amount of the upper baseboard 4, the outer lens barrel 12 or the interlocking cam portion 12d of the outer lens barrel 12 is x), a movement amount of the finder second lens group 33 from the maximum wide angle position is y, a distance from the axis 32 to the follower 31a is a, and a distance from the shaft 32 to the finder driving pin 31b is b.

That is, the relationship "y=CX (on condition that C=b/a)" is established. Designing the photographic lens and the finder to establish this relationship can make simple the construction of a finder lens which interlocks with a zoom lens.

Figure 4:
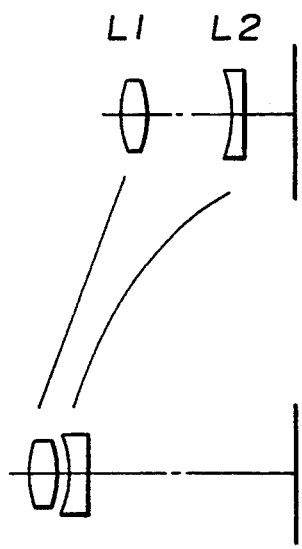
FIG. 4 is an explanatory diagram of a lens moving state of a photographic zoom lens system.

Here, a state of lens movement will be explained. FIG. 4 shows a state of the movement of the two lens-group type photographic zoom lens. Referring to FIG. 4, this zoom lens is composed of the first lens group L1 that is a convex one-lens group and the second lens group L2 that is a concave one-lens group, wherein the second lens group L2 moves to compensate the focal point in accordance with moving of the first lens group L1.

Figure 5:
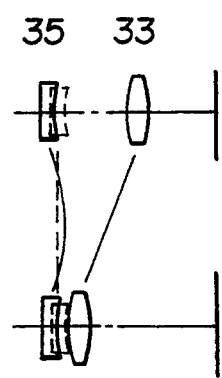
FIG. 5 is an explanatory diagram of a lens moving state of a zoom finder system.

FIG. 5 shows the low-powered zoom finder optical system for the zoom lens shown in FIG. 4. Referring to FIG. 5, this zoom finder is composed of the first lens group 35 that is a concave lens group and the second lens group 33 that is a convex lens group, wherein zooming is performed by the second lens group 33 and compensating of the focal point is performed by the first lens group 35. Frequently, when manufacturing inexpensive cameras, the influence of being out of focus by lowering finder magnification is reduced and the first lens group 35 is fixed as shown by a broken line.

As shown in FIGS. 1 and 3, a zoom positional contact 40 composed of five contact pieces is fixed to the zoom interlocking lever 31. The zoom positional contact 40 slides on a zoom positional baseboard 41, turns on or off in response to the shape of the conductive pattern on the baseboard 41, and indicates, by turning on and off a set of signals, a position of the outer lens barrel 12 being moved by zooming. This zoom positional baseboard 41 is made by flash processing, which makes a hard baseboard into a flat board with a conductive pattern, so that high reliability can be obtained.

Reference numeral 42 denotes a Porro prism of the finder system that is arranged to avoid the movement range of the zoom interlocking lever 31 behind the shaft 32 of the zoom interlocking lever 31.

Reference numeral 44 denotes a holder of the electric flash unit, holding a reflector 45 and a xenon tube 46, etc. The holder 44 is guided by a shaft 47 in such a manner as to be capable of moving straight along the photographic axis, and is moved back and forth in accordance with zooming by engaging with a flash unit interlocking pin 31d provided on the other end of the zoom interlocking lever 31, resulting in gathering light and increasing a guide number. The reason for the foregoing results is that the distribution of light is determined in accordance with a positional relationship of an optical system established by the reflector 45 and a light-gathering lens 48 provided in the front of the camera body 2. Thus, the more the photographic lens moves to the telephoto side by zooming, the narrower the distribution of light, so that a guide number increases.

The outer lens barrel 12 moves, for example, 8 mm from the final collapsing position to the maximum wide angle position, and 25 mm from the maximum wide angle position to the maximum telephoto position. This "8+25=33 mm" is almost equal to the thickness of the camera body, resulting in using all of a certain area of the camera body 2 from the front to the rear.

On the other hand, it is supposed that the length of a stroke of the electric flash unit for zooming is 6-8 mm.

So the zoom interlocking lever 31 needs a length of about 45 mm from the shaft 32 to the follower 31a, which is 1.2–1.5 times as long as 33 mm, and a length of about 10 mm from the shaft 32 to the flash unit interlocking pin 31d, which is 1.2 to 1.5 times as long as 8 mm. As a result, in order to accommodate this lever 31, a 35 mm×55 mm flat area, which is extremely large for a camera, is necessary. Such a flat area can be established under an AF distance measuring block or the finder, which is located on the top of the camera body so that the hand of the user of the camera does not touch the AF distance measuring block or the finder during an operation, or between the lens barrel and a film chamber or a spool chamber. However, establishing the flat area at the side of the lens barrel leads to the drawback of increasing the width of the camera body because of an arrangement of the flat area. Therefore, it is effective in miniaturizing the camera to use a space between the lens barrel and the AF distance measuring block or the finder, which is located slightly away from the lens barrel in order to prevent the lens barrel from eclipsing a finder optical path or an AF optical path.

As will be understood from FIG. 3, which is the front view of the lens barrel, in the case of the real-image type finder using the Porro prism, only the Porro prism of an image reversing portion is so big as to protrude under the finder as shown in FIG. 3, resulting in placing restrictions on constructing a mechanism under the finder.

In the present embodiment, by means of the zoom interlocking lever 31, the zoom positional contact 40 is arranged in such a manner that a movement stroke of the zoom positional contact 40 is reduced in comparison with a movement stroke of the outer lens barrel 12, and in such a manner so as to rotate within only a fan shape space. Therefore, the space under the finder optical path can be effectively used combining with the space of the Porro prism of the finder, thus contributing to miniaturizing the camera.

The zoom interlocking lever 31 is provided with a bumplike counterweight 31e. This counterweight 31e is a portion for adjusting weight in order to balance a ratio of the moment of inertia of the zoom interlocking lever 31 with respect to the shaft 32, based on weights of the flash unit and the finder lens, which act on the flash unit interlocking pin 31d and the finder interlocking pin 31b, respectively, and the zoom interlocking lever 31 own weight. Providing this kind of bumplike counterweight 31e prevents damages from accidents such as when the electric flash unit hits a wall or hits an inside mechanism therefore breaking down on impact because of an imbalance caused by the weight of the electric flash unit.

The purpose of dividing the cam of the outer lens barrel 12 into the collapsing cam portion 12c and the interlocking cam portion 12d is to prevent the finder or the flash unit from moving very much when the photographic lens is further collapsed and accommodated from the maximum wide angle position. That is, the zoom interlocking lever 31 is arranged not to be rotated relative to the stroke of the outer lens barrel 12 while the follower 31a slides down the collapsing cam portion "12C" from the maximum wide angle position to the final collapsing position. The purpose of providing the cam of the outer lens barrel 12 with accommodating cam portion 12b adjacent to the final collapsing position is to correctly turn on and position-control the zoom positional contact 40 with a rotation amount of the zoom interlocking lever 31 in proportion to a movement amount of the outer lens barrel 12.

According to the above-described embodiment, when the holder 44 of the electric flash unit and the lenses of the finder are moved, power is applied to the holder 44 and the second lens group 33 of the finder in approximately their respective moving directions. Therefore, the contact portion of the holder 44 and the second lens group 33 can be prevented from being rubbed perpendicularly to the moving directions thereof at a high speed, thus reducing wear. The first lens group 35 of the finder is prevented from vibrating by an applied frictional force, by selecting a size of the cam in response to a movement amount of the first lens group 35.

Figure 6:
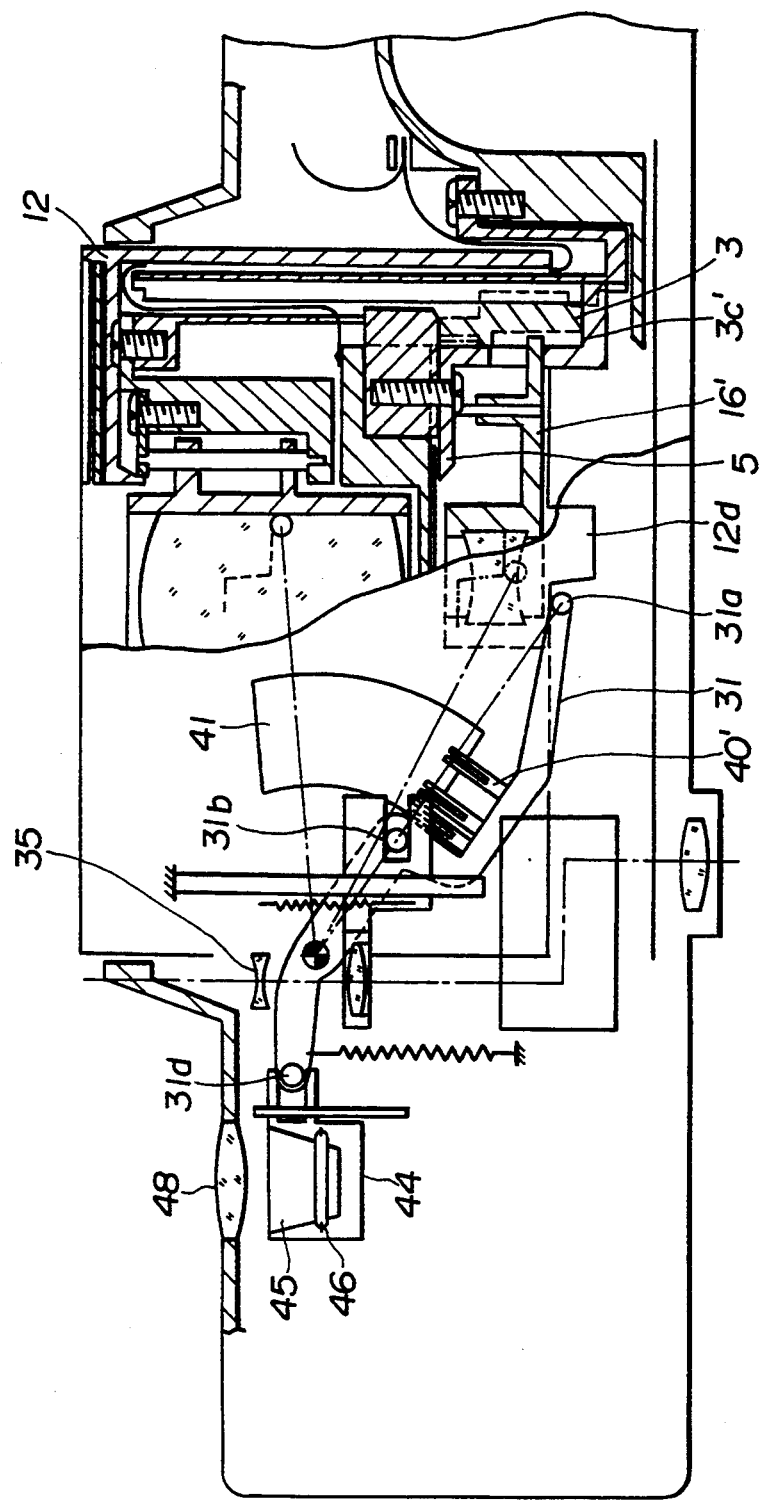
FIG. 6 is a partially cut away construction diagram of a two focal length changeable camera in accordance with a second preferred embodiment of the present invention.

FIG. 6 shows a second preferred embodiment of the present invention. In order to simplify the explanation, the same numerals or characters as in the first embodiment are used for the same elements in FIG. 6, and only aspects differing from the first embodiment will be described.

The present embodiment shows an application to a two focal-lengths changeable camera. Referring to FIG. 6, the second lens group of the photographic lens is rotatably supported as extender 16' on the lower baseboard 5, and is taken in and out of the photographic path by a cam portion 3c' provided on the inner surface portion of the cam barrel 3. Furthermore, the first lens group 35 of the finder system is fixed and cuts off interlocking with the zoom interlocking lever 31, and a zoom positional contact 40' for detecting a wide angle state or a telephoto state is composed of three contacts. The remaining construction details are the same as in the above-described first embodiment.

According to the above-described first and second embodiments, the lever, which transmits a movement in proportion to moving of the first lens group of the zoom lens, has the rotating shaft thereof, the follower for the zoom lens outer barrel and the driving portion for the finder in such a manner so as to be substantially in a straight line. Therefore, the interlocking mechanism is simplified, the degree of freedom of the construction is increased, the lens of the finder is subject to less vibration, and accuracy of the mechanism is improved.

Also, it becomes unnecessary to have an interlocking mechanism, with the flash unit or the finder, on an outer surface of the rotatable cam ring. Therefore, the degree of freedom of the construction of the zoom lens barrel is increased. Moreover, the zoom interlocking lever reduces the movement amount and reverses the direction. Thus, the mechanism is simplified, the reliability is improved, the movement o o is smoothly performed, and the cost is reduced.

Furthermore, the zoom interlocking lever is arranged in such a manner that the driving portion for the electric flash unit balances with the driving portion for the finder, so that a drawback of the lever type zoom flash unit driving mechanism is overcome to increase shock resistance.

Also, a position of the zoom positional contact corresponding to the zoom interlocking lever can be appropriately selected in such a manner as to have the best stroke in accordance with pattern resolution of the zoom positional baseboard. Thus a construction with excellent abrasion resistance qualities is accomplished, and cost reduction is accomplished by miniaturizing the zoom positional baseboard. Moreover, arranging the zoom interlocking lever under the finder optical system and in front of the Porro prism effectively uses a space that is difficult to use, thus resulting in miniaturizing a camera.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A camera adapted for use with a finder optical unit and a variable magnification photographic optical unit, said camera comprising:
    a follower portion for following a magnification varying operation of the variable magnification photographic optical system;
    a driving portion for driving the finder optical unit in accordance with the magnification varying operation of the variable magnification photographic optical unit;
    a supporting portion; and
    an elongated interlocking portion, pivotably supported around a supporting portion, wherein each of said follower portion and said driving portion are connected to said interlocking portion at different points along a length of said interlocking portion, and wherein said supporting portion, said follower portion, and said driving portion are disposed along a substantially straight line.

2. A camera according to claim 1, wherein the driving portion comprises means for varying a magnification of said finder optical system.

3. A camera according to claim 1, wherein said follower portion comprises means for following a first lens group of the variable magnification photographic optical unit.

4. A camera according to claim 1, wherein the variable magnification photographic optical unit comprises a zoom optical system.

5. A camera according to claim 1, wherein the variable magnification photographic optical unit comprises a two focal-lengths changeable optical system.

6. A camera according to claim 1, wherein the interlocking portion comprises a flash unit driving portion for driving a flash unit in accordance with the magnification varying operation of said variable magnification photographic optical unit.

7. A camera according to claim 6, wherein said flash unit driving portion is arranged on an opposite side of said follower portion with respect to said supporting portion.

8. A camera according to claim 7, wherein said flash unit driving portion is arranged at an end of said interlocking portion.

9. A camera according to claim 6, wherein the flash unit driving portion comprises means for varying a guide number of said flash unit.

10. A camera according to claim 6, wherein said interlocking portion comprises a counterweight on an opposite side of said flash unit driving portion with respect to said supporting portion.

11. A camera according to claim 6, wherein said flash unit driving portion is arranged in such a manner that said flash unit driving portion, said supporting portion, said follower portion, and said driving portion are substantially in a straight line.

12. A camera according to claim 1, wherein said interlocking portion comprises detection means for detecting a state of magnification of the variable magnification photographic optical unit.

13. A camera according to claim 12, wherein said detection means is arranged between the finder optical unit and the variable magnification photographic optical unit.

14. A camera according to claim 1, wherein said interlocking portion is arranged between the finder optical unit and the variable magnification photographic optical unit.

15. A camera adapted for use with a finder optical unit and a variable magnification photographic optical unit, said camera comprising:
    a follower portion for following a magnification varying operation of the variable magnification photographic optical unit;

a flash unit driving portion for driving a flash unit in accordance with the magnification varying operation of the variable magnification photographic optical unit;

a finder driving portion for driving the finder optical unit in accordance with the magnification varying operation of the variable magnification photographic optical unit;

a supporting portion; and an elongated interlocking portion, pivotably supported by said supporting portion, wherein each of said follower portion, said flash unit driving portion, and said finder driving portion are connected to said interlocking portion at different points along a length of said interlocking portion, and wherein said follower portion and said flash unit driving portion are disposed on opposite sides with respect to said supporting portion.

16. A camera according to claim 15, wherein said follower portion comprises means for following a first lens group of the variable magnification photographic optical unit.

17. A camera according to claim 15, wherein said variable magnification photographic optical unit comprises a zoom optical system.

18. A camera according to claim 15, wherein said variable magnification photographic optical unit comprises a two focal-lengths changeable optical system.

19. A camera according to claim 15, wherein said flash unit driving portion is arranged at an end of said interlocking portion.

20. A camera according to claim 15, wherein said flash unit driving portion comprises means for varying a guide number of the flash unit.

21. A camera according to claim 15, wherein said interlocking portion is arranged between the finder optical unit and the variable magnification photographic optical unit.

22. A camera according to claim 15, wherein said interlocking portion comprises a counterweight on an opposite side of said flash unit driving portion with respect to said supporting portion.

23. A camera according to claim 15, wherein said interlocking portion comprises detection means for detecting a state of magnification of the variable magnification photographic optical unit.

24. A camera according to claim 23, wherein said detection means is arranged between a finder optical system and said variable magnification photographic optical unit.

25. A camera according to claim 15, wherein said flash unit driving portion is arranged in such a manner that said supporting portion, said flash unit follower portion, and said driving portion are substantially in a straight line.

26. An apparatus for a camera adapted for use with a finder optical unit and a variable magnification photographic optical unit, said apparatus comprising:

a follower portion for following a magnification varying operation of the variable magnification photographic optical unit;

a driving portion for driving the finder optical unit in accordance with the magnification varying operation of the variable magnification photographic optical unit;

a supporting portion; and an elongated interlocking portion, pivotably supported by said supporting portion, wherein each of said follower portion and said driving portion are connected to said interlocking portion at different points along a length of said interlocking portion, and wherein said supporting portion, said follower portion, and said driving portion are disposed along a substantially straight line.

27. An apparatus according to claim 26, wherein said driving portion comprises means for varying a magnification of the finder optical unit.

28. An apparatus according to claim 26, wherein said follower portion comprises means for following a first lens group of the variable magnification photographic optical unit.

29. An apparatus according to claim 26, wherein said variable magnification photographic optical unit comprises a zoom optical system.

30. An apparatus according to claim 26, wherein said variable magnification photographic optical unit comprises a two focal-lengths changeable optical system.

31. An apparatus according to claim 26, wherein said interlocking portion comprises a flash unit driving portion for driving a flash unit in accordance with the magnification varying operation of the variable magnification photographic optical unit.

32. An apparatus according to claim 31, wherein said flash unit driving portion is arranged on an opposite side of said follower portion with respect to said supporting portion.

33. An apparatus according to claim 32, wherein said flash unit driving portion is arranged at an end of said interlocking portion.

34. An apparatus according to claim 31, wherein said flash unit driving portion comprises means for varying a guide number of the flash unit.

35. An apparatus according to claim 31, wherein said interlocking portion comprises a counterweight on an opposite side of said flash unit driving portion with respect to said supporting portion.

36. An apparatus according to claim 31, wherein said flash unit driving portion is arranged in such a manner that said flash unit driving portion, said supporting portion, said follower portion, and said driving portion are substantially in a straight line.

37. An apparatus according to claim 26, wherein said interlocking portion comprises detection means for detecting a state of magnification of the variable magnification photographic optical unit.

38. An apparatus according to claim 37, wherein said detection means is arranged between the finder optical unit and the variable magnification photographic optical unit.

39. An apparatus according to claim 31, wherein said interlocking portion is arranged between the finder optical unit and the variable magnification photographic optical unit.

40. An apparatus for a camera adapted for use with a finder optical unit and a variable magnification photographic optical unit, said camera comprising:

a follower portion for following a magnification varying operation of the variable magnification photographic optical unit;

a flash unit driving portion for driving a flash unit in accordance with the magnification varying operation of the variable magnification photographic optical unit;

a finder driving portion for driving the finder optical unit in accordance with the magnification varying operation of the variable magnification photographic optical unit;

a supporting portion; and an elongated interlocking portion, pivotably supported by said supporting portion, wherein each of said follower portion, said flash unit driving portion, and said finder driving portion are connected to said interlocking portion at different points along a length of said interlocking portion, and wherein the follower portion and said flash unit driving portion are disposed on opposite sides with respect to said supporting portion.

41. An apparatus according to claim 40, wherein said follower portion comprises means for following a first lens group of the variable magnification photographic optical unit.

42. An apparatus according to claim 40, wherein the variable magnification photographic optical unit comprises a zoom optical system.

43. An apparatus according to claim 40, wherein the variable magnification photographic optical unit comprises a two focal-lengths changeable optical system.

44. An apparatus according to claim 40, wherein said flash unit driving portion is arranged at an end of said interlocking portion.

45. An apparatus according to claim 40, wherein said flash unit driving portion comprises means for varying a guide number of the flash unit.

46. An apparatus according to claim 40, wherein said interlocking portion is arranged between the finder optical unit and the variable magnification photographic optical unit.

47. An apparatus according to claim 40, wherein said flash unit interlocking portion comprises a counterweight on an opposite side of said driving portion with respect to said supporting portion.

48. An apparatus according to claim 40, wherein said interlocking portion comprises detection means for detecting a state of magnification of the variable magnification photographic optical unit.

49. An apparatus according to claim 48, wherein said detection means is arranged between the finder optical unit and the variable magnification photographic optical unit.

50. An apparatus according to claim 40, wherein said flash unit driving portion is arranged in such a manner that said supporting portion, said follower portion, and said flash unit driving portion are substantially in a straight line.

51. An apparatus adapted for use with a finder optical unit and a variable magnification imaging optical unit, said apparatus comprising:

a follower portion for following a magnification varying operation of the variable magnification imaging optical unit;

a driving portion for driving a finder optical unit in accordance with the magnification varying operation of the variable magnification imaging optical unit;

a supporting portion; and an elongated interlocking portion, pivotably supported by said supporting portion, wherein each of said follower portion and said driving portion are connected to said interlocking portion at different points along a length of said interlocking portion, and wherein said supporting portion, said follower portion, and said driving portion are disposed along a substantially straight line.

52. An apparatus according to claim 51, wherein the driving portion comprises means for varying a magnification of the finder optical unit.

53. An apparatus according to claim 51, wherein said follower portion comprises means for following a first lens group of the variable magnification imaging optical unit.

54. An apparatus according to claim 51, wherein the variable magnification imaging optical unit comprises a zoom optical system.

55. An apparatus according to claim 51, wherein the variable magnification imaging optical unit comprises a two focal-lengths changeable optical system.

56. An apparatus according to claim 51, wherein said interlocking portion comprises a flash unit driving portion for driving a flash unit in accordance with the magnification varying operation of the variable magnification imaging optical unit.

57. An apparatus according to claim 56, wherein said flash unit driving portion is arranged on an opposite side of said follower portion with respect to said supporting portion.

58. An apparatus according to claim 57, wherein said flash unit driving portion is arranged at an end of said interlocking portion.

59. An apparatus according to claim 56, wherein said flash unit driving portion comprises means for varying a guide number of the flash unit.

60. An apparatus according to claim 56, wherein said interlocking portion comprises a counterweight on an opposite side of said flash unit driving portion with respect to said supporting portion.

61. An apparatus according to claim 56, wherein said flash unit driving portion is arranged in such a manner that said flash unit driving portion, said supporting portion, said follower portion, and said driving portion are substantially in a straight line.

62. An apparatus according to claim 51, wherein said interlocking portion comprises detection means for detecting a state of magnification of the variable magnification imaging optical unit.

63. An apparatus according to claim 62, wherein said detection means is arranged between the finder optical unit and the variable magnification imaging optical unit.

64. An apparatus according to claim 51, wherein said interlocking portion is arranged between the finder optical unit and the variable magnification imaging optical unit.

65. An apparatus adapted for use with a finder optical unit and a variable magnification imaging optical unit, said apparatus comprising:

a follower portion for following a magnification varying operation of the variable magnification imaging optical unit;

a flash unit driving portion for driving a flash unit in accordance with the magnification varying operation of the variable magnification imaging optical unit;

a finder driving portion for driving the finder optical unit in accordance with the magnification varying operation of the variable magnification imaging optical unit;

a supporting portion; and an elongated interlocking portion, pivotably supported by said supporting portion, wherein each of said follower portion, said flash unit driving portion, and said finder driving portion are connected to said interlocking portion at different points along a length of said interlocking portion, and wherein said follower portion and said flash unit driving portion are disposed on opposite sides with respect to said supporting portion.

66. An apparatus according to claim 65, wherein said follower portion comprises means for following a first lens group of the variable magnification imaging optical unit.

67. An apparatus according to claim 65, wherein the variable magnification imaging optical unit comprises a zoom optical system.

68. An apparatus according to claim 65, wherein the variable magnification imaging optical unit comprises a two focal-lengths changeable optical system.

69. An apparatus according to claim 65, wherein said flash unit driving portion is arranged at an end of said interlocking portion.

70. An apparatus according to claim 65, wherein said flash unit driving portion comprises means for varying a guide number of the flash unit.

71. An apparatus according to claim 65, wherein said interlocking portion is arranged between the finder optical unit and variable magnification imaging optical unit.

72. An apparatus according to claim 65, wherein said interlocking portion comprises a counterweight on an opposite side of said flash unit driving portion with respect to said supporting portion.

73. An apparatus according to claim 65 wherein said interlocking portion comprises detection means for detecting a state of magnification of the variable magnification imaging optical unit.

74. An apparatus according to claim 73, wherein said detection means is arranged between the finder optical unit and the variable magnification imaging optical unit.

75. An apparatus according to claim 65, wherein flash unit driving portion is arranged in such a manner that the supporting portion, said flash unit follower portion, and said driving portion are substantially in a straight line.

76. A camera adapted for use with a finder optical unit and a variable magnification photographic optical unit, said camera comprising:
- a first connecting portion connected to the variable magnification photographic optical unit, and moving in accordance with a magnification varying operation of the variable magnification photographic optical unit;
- a second connecting portion for connecting to the finder optical unit in accordance with the magnification varying operation of the variable magnification photographic optical unit;
- a supporting portion; and
- an elongated interlocking portion, pivotably supported by said supporting portion, wherein each of said first connecting portion and said second connecting portion are connected to said interlocking portion at different points along a length of said interlocking portion, and wherein the supporting portion, said first connecting portion, and said second connecting portion are disposed along a substantially straight line.

77. A camera according to claim 76, wherein said second connecting portion comprises means for varying a magnification of the finder optical system.

78. A camera according to claim 76, wherein said first connecting portion comprises means for connecting to a first lens group of the variable magnification photographic optical unit.

79. A camera according to claim 76, wherein the variable magnification photographic optical unit comprises a zoom optical system.

80. A camera according to claim 76, wherein the variable magnification photographic optical unit comprises a two focal-lengths changeable optical system.

81. A camera according to claim 76, wherein said interlocking portion comprises a flash unit driving portion for driving a flash unit in accordance with the magnification varying operation of the variable magnification photographic optical unit.

82. A camera according to claim 81, wherein said flash unit driving portion is arranged on an opposite side of said first connecting portion with respect to said supporting portion.

83. A camera according to claim 82, wherein the flash unit driving portion is arranged at an end of said interlocking portion.

84. A camera according to claim 81, wherein said flash unit driving portion comprises means for varying a guide number of the flash unit.

85. A camera according to claim 81, wherein said interlocking portion comprises a counterweight on an opposite side of said flash unit driving portion with respect to said supporting portion.

86. A camera according to claim 81, wherein said flash unit driving portion is arranged in such a manner that said flash unit driving portion, said supporting portion, said first connecting portion, and said second connecting portion are substantially in a straight line.

87. A camera according to claim 76, wherein said interlocking portion comprises detection means for detecting a state of magnification of the variable magnification photographic optical unit.

88. A camera according to claim 87, wherein said detection means is arranged between the finder optical unit and the variable magnification photographic optical unit.

89. A camera according to claim 76, wherein said interlocking portion is arranged between the finder optical unit and the variable magnification photographic optical unit.

90. A camera adapted for use with a finder optical unit and a variable magnification photographic optical unit, said camera comprising:
- a first connecting portion connected to the variable magnification photographic optical unit, and moving in accordance with a magnification varying operation of the variable magnification photographic optical unit;
- a second connecting portion for connecting to a flash unit in accordance with the magnification varying operation of the variable magnification photographic optical unit;
- a finder driving portion for driving the finder optical unit in accordance with the magnification varying operation of the variable magnification photographic optical unit;
- a supporting portion; and
- an elongated interlocking portion, pivotably supported by said supporting portion, wherein each of said first connecting portion, said second connecting portion, and said finder driving portion are connected to said interlocking portion at different points along a length of said interlocking portion, and wherein the first connecting portion and said second connecting portion are disposed on opposite sides with respect to said supporting portion.

91. A camera according to claim 90, wherein said first connecting portion comprises means for connecting to a first lens group of the variable magnification photographic optical unit.

92. A camera according to claim 90, wherein the variable magnification photographic optical unit comprises a zoom optical system.

93. A camera according to claim 90, wherein the variable magnification photographic optical unit comprises a two focal-lengths changeable optical system.

94. A camera according to claim 90, wherein said second connecting portion is arranged at an end of said interlocking portion.

95. A camera according to claim 90, wherein said second connecting portion comprises means for varying a guide number of the flash unit.

96. A camera according to claim 90, wherein said interlocking portion is arranged between the finder optical unit and the variable magnification photographic optical unit.

97. A camera according to claim 90, wherein said interlocking portion comprises a counterweight on an opposite side of said second connecting portion with respect to said supporting portion.

98. A camera according to claim 90, wherein said interlocking portion comprises detection means for detecting a state of magnification of the variable magnification photographic optical unit.

99. A camera according to claim 98, wherein said detection means is arranged between the finder optical unit and the variable magnification photographic optical unit.

100. A camera according to claim 90, wherein said second connecting portion is arranged in such a manner that said supporting portion, said first connecting portion, and said second connecting portion are substantially in a straight line.

101. An apparatus for a camera adapted for use with the finder optical unit and a variable magnification photographic optical unit, said apparatus comprising:
  a first connecting portion connected to the variable magnification photographic optical unit, and moving in accordance with a magnification varying operation of the variable magnification photographic optical unit;
  a second connecting portion for connecting to the finder optical unit in accordance with the magnification varying operation of the variable magnification photographic optical unit;
  a supporting portion; and
  an elongated interlocking portion, pivotably supported by said supporting portion, wherein each of said first connecting portion and said second connecting portion are connected to said interlocking portion at different points along a length of said interlocking portion, and wherein the supporting portion, said first connecting portion, and said second connecting portion are disposed along a substantially straight line.

102. An apparatus according to claim 101, wherein said second connecting portion comprises means for varying a magnification of the finder optical unit.

103. An apparatus according to claim 101, wherein said first connecting portion comprises means for connecting to a first lens group of the variable magnification photographic optical unit.

104. An apparatus according to claim 101, wherein the variable magnification photographic optical unit comprises a zoom optical unit.

105. An apparatus according to claim 101, wherein the variable magnification photographic optical unit comprises a two focal-lengths changeable optical system.

106. An apparatus according to claim 101, wherein the interlocking portion comprises a flash unit driving portion for driving a flash unit in accordance with the magnification varying operation of the variable magnification photographic optical unit.

107. An apparatus according to claim 106, wherein said flash unit driving portion is arranged on an opposite side of said first connecting portion with respect to said supporting portion.

108. An apparatus according to claim 107, wherein said flash unit driving portion is arranged at an end of said interlocking portion.

109. An apparatus according to claim 106, wherein the flash unit driving portion comprises means for varying a guide number of said flash unit.

110. An apparatus according to claim 106, wherein said interlocking portion comprises a counterweight on an opposite side of said flash unit driving portion with respect to said supporting portion.

111. An apparatus according to claim 106, wherein said flash unit driving portion is arranged in such a manner that said flash unit driving portion, said supporting portion, said first connecting portion, and said second connecting portion are substantially in a straight line.

112. An apparatus according to claim 101, wherein the interlocking portion comprises detection means for detecting a state of magnification of the variable magnification photographic optical unit.

113. An apparatus according to claim 112, wherein said detection means is arranged between the finder optical unit and the variable magnification photographic optical unit.

114. An apparatus according to claim 106, wherein said interlocking portion is arranged between the finder optical unit and the variable magnification photographic optical unit.

115. An apparatus for a camera adapted for use with the finder optical unit and a variable magnification photographic optical unit, said apparatus comprising:
  a first connecting portion connected to the variable magnification photographic optical unit, and moving in accordance with a magnification varying operation of the variable magnification photographic optical unit;
  a second connecting portion for connecting to a flash unit in accordance with the magnification varying operation of the variable magnification photographic optical unit;
  the finder driving portion for driving the finder optical unit in accordance with the magnification varying operation of the variable magnification photographic optical unit;
  a supporting portion; and
  an elongated interlocking portion, pivotably supported by said supporting portion, wherein each of said first connecting portion, said second connecting portion, and said finder driving portion are connected to said interlocking portion at different points along a length of said interlocking portion, and wherein said first connecting portion and said second connecting portion are disposed on opposite sides with respect to said supporting portion.

116. An apparatus according to claim 115, wherein said first connecting portion comprises means for connecting to a first lens group of the variable magnification photographic optical unit.

117. An apparatus according to claim 115, wherein the variable magnification photographic optical unit comprises a zoom optical unit.

118. An apparatus according to claim 115, wherein the variable magnification photographic optical unit comprises a two focal-lengths changeable optical unit.

119. An apparatus according to claim 115, wherein said second connecting portion is arranged at an end of said interlocking portion.

120. An apparatus according to claim 115, wherein the second connecting portion comprises means for varying a guide number of said flash unit.

121. An apparatus according to claim 115, wherein said interlocking portion is arranged between the finder optical unit and the variable magnification photographic optical unit.

122. An apparatus according to claim 115, wherein said interlocking portion comprises a counterweight on an opposite side of said second connecting portion with respect to said supporting portion.

123. An apparatus according to claim 115, wherein said interlocking portion comprises detection means for detecting a state of magnification of the variable magnification photographic optical unit.

124. An apparatus according to claim 123, wherein said detection means is arranged between the finder optical unit and the variable magnification photographic optical unit.

125. An apparatus according to claim 115, wherein said second connecting portion is arranged in such a manner that said supporting portion, said first connecting portion, and said second connecting portion are substantially in a straight line.

126. An apparatus adapted for use with the finder optical unit and a variable magnification imaging optical unit, said apparatus comprising:
a first connecting portion connected to the variable magnification imaging optical unit, and moving in accordance with a magnification varying operation of the variable magnification imaging optical unit;
a second connecting portion for connecting to the finder optical unit in accordance with the magnification varying operation of the variable magnification imaging optical unit;
a supporting portion; and
an elongated interlocking portion, pivotably supported by said supporting portion, wherein each of said first connecting portion and said second connecting portion are connected to said interlocking portion at different points along a length of said interlocking portion, and wherein the supporting portion, said first connecting portion, and said second connecting portion are disposed along a substantially straight line.

127. An apparatus according to claim 126, wherein said second connecting portion comprises means for varying a magnification of said finder optical unit.

128. An apparatus according to claim 126, wherein said first connecting portion comprises means for connecting to a first lens group of the variable magnification imaging optical unit.

129. An apparatus according to claim 126, wherein the variable magnification imaging optical unit comprises a zoom optical unit.

130. An apparatus according to claim 126, wherein the variable magnification imaging optical unit comprises a two focal-lengths changeable optical unit.

131. An apparatus according to claim 126, wherein the interlocking portion comprises a flash unit driving portion for driving a flash unit in accordance with the magnification varying operation of the variable magnification imaging optical unit.

132. An apparatus according to claim 131, wherein said flash unit driving portion is arranged on an opposite side of said first connecting portion with respect to said supporting portion.

133. An apparatus according to claim 132, wherein said flash unit driving portion is arranged at an end of said interlocking portion.

134. An apparatus according to claim 131, wherein said flash unit driving portion comprises means for varying a guide number of the flash unit.

135. An apparatus according to claim 131, wherein said interlocking portion comprises a counterweight on an opposite side of said flash unit driving portion with respect to said supporting portion.

136. An apparatus according to claim 131, wherein said flash unit driving portion is arranged in such a manner that said flash unit driving portion, said supporting portion, said first connecting portion, and said second connecting portion are substantially in a straight line.

137. An apparatus according to claim 126, wherein said interlocking portion comprises detection means for detecting a state of magnification of the variable magnification imaging optical unit.

138. An apparatus according to claim 137, wherein said detection means is arranged between the finder optical unit and the variable magnification imaging optical unit.

139. An apparatus according to claim 126, wherein said interlocking portion is arranged between the finder optical unit and the variable magnification imaging optical unit.

140. An apparatus adapted for use with the finder optical unit and a variable magnification imaging optical unit, said apparatus comprising:
a first connecting portion connected to the variable magnification imaging optical unit, and moving in accordance with a magnification varying operation of the variable magnification imaging optical unit;
a second connecting portion for connecting to a flash unit in accordance with the magnification varying operation of the variable magnification imaging optical unit;
the finder driving portion for driving the finder optical unit in accordance with the magnification varying operation of the variable magnification imaging optical unit;
a supporting portion; and
an elongated interlocking portion, pivotably supported by said supporting portion, wherein each of said first connecting portion, said second connecting portion, and said finder driving portion are connected to said interlocking portion at different points along a length of said interlocking portion, and wherein the first connecting portion and said second connecting portion are disposed on opposite sides with respect to said supporting portion.

141. An apparatus according to claim 140, wherein the first connecting portion comprises means for connecting to a first lens group of the variable magnification imaging optical unit.

142. An apparatus according to claim 140, wherein the variable magnification imaging optical unit comprises a zoom optical unit.

143. An apparatus according to claim 140, wherein the variable magnification imaging optical unit comprises a two focal-lengths changeable optical unit.

144. An apparatus according to claim 140, wherein said second connecting portion is arranged at an end of said interlocking portion.

145. An apparatus according to claim 140, wherein said second connecting portion comprises means for varying a guide number of the flash unit.

146. An apparatus according to claim 140, wherein said interlocking portion is arranged between the finder optical unit and the variable magnification imaging optical unit.

147. An apparatus according to claim 140, wherein said interlocking portion comprises a counterweight on an opposite side of said second connecting portion with respect to said supporting portion.

148. An apparatus according to claim 140, wherein the interlocking portion comprises detection means for detecting a state of magnification of the variable magnification imaging optical unit.

149. An apparatus according to claim 148, wherein said detection means is arranged between the finder optical unit and the variable magnification imaging optical unit.

150. An apparatus according to claim 140, wherein said second connecting portion is arranged in such a manner that said supporting portion, said first connecting portion, and said second connecting portion are substantially in a straight line.

* * * * *

UNITED STATES PATENT AND TRADEMARK OFFICE
CERTIFICATE OF CORRECTION

PATENT NO. : 5,410,379
DATED : April 25, 1995
INVENTOR(S) : Michio HIROHATA

It is certified that error appears in the above-indentified patent and that said Letters Patent is hereby corrected as shown below:

TITLE PAGE

[56] REFERENCES CITED:

FOREIGN PATENT DOCUMENTS

"0248933" should read --2-48933--.

COLUMN 2:

Line 18, "DRAWING" should read --DRAWINGS--.

COLUMN 3:

Line 2, "mechanism 8" should read --mechanism--.
Line 42, "group" should read --groups--.
Line 45, "groups" should read --group--.

COLUMN 4:

Line 5, "accordances" should read --accordance--.
Line 50, ""y=CX" should read --"y=Cx--.

UNITED STATES PATENT AND TRADEMARK OFFICE
CERTIFICATE OF CORRECTION

PATENT NO. : 5,410,379
DATED : April 25, 1995
INVENTOR(S) : Michio HIROHATA

It is certified that error appears in the above-indentified patent and that said Letters Patent is hereby corrected as shown below:

COLUMN 6:

Line 27, "lever 31" should read --lever 31's--.
    Line 29, "damages" should read --damage--.
    Line 42, "12C" should read --12c--.

COLUMN 7:

Line 31, "o o" should be deleted.

COLUMN 8:

Line 14, "the" should read --said--.
    Line 16, "said" should read --the--; and "system." should read --unit.--.
    Line 27, "the" should read --said--.
    Line 30, "said" should read --the--.
    Line 39, "the" should read --said--.
    Line 41, "said" should read --the--.

COLUMN 9:

Line 23, "said" should read --the--.
    Line 26, "said" should read --the--.
    Line 48, "a" should read --the--.
    Line 49, "system" should read --unit--; and "said" should read --the--.
    Line 53, "flash unit" should be deleted.
    Line 54, "driving" should read --flash unit driving--.

UNITED STATES PATENT AND TRADEMARK OFFICE
CERTIFICATE OF CORRECTION

PATENT NO. : 5,410,379
DATED : April 25, 1995
INVENTOR(S) : Michio HIROHATA

It is certified that error appears in the above-indentified patent and that said Letters Patent is hereby corrected as shown below:

COLUMN 10:

Line 14, "said" should read --the--.
Line 17, "said" should read --the--.

COLUMN 12:

Line 1, "the" should read --said--.

COLUMN 13:

Line 23, "variable" should read --the variable--.
Line 36, "flash" should read --said flash--.
Line 38, "the" should read --said--; and "flash unit" should be deleted.
Line 39, "driving" should read --flash unit driving--.
Line 60, "the" should read --said--.
Line 66, "system." should read --unit.--.

COLUMN 14:

Line 18, "the" should read --said--.
Line 68, "the" should read --said--.

UNITED STATES PATENT AND TRADEMARK OFFICE
CERTIFICATE OF CORRECTION

PATENT NO. : 5,410,379
DATED : April 25, 1995
INVENTOR(S) : Michio HIROHATA

Page 4 of 5

It is certified that error appears in the above-indentified patent and that said Letters Patent is hereby corrected as shown below:

COLUMN 15:

Line 58, "the" should read --said--.

COLUMN 16:

Line 3, "unit." should read --system.--.
Line 9, "the" should read --said--.
Line 21, "the" should read --said--.
Line 22, "said" should read --the--.
Line 34, "the" should read --said--.
Line 57, "the" (first occurrence) should read --a--.

COLUMN 17:

Line 9, "unit." should read --system.--.
Line 12, "unit." should read --system.--.
Line 17, "the" should read --said--.
Line 18, "said" should read --the--.
Line 58, "the" should read --said--.

COLUMN 18:

Line 3, "unit." should read --system.--.
Line 6, "unit." should read --system.--.
Line 8, "the" should read --said--.
Line 55, "the" (first occurrence) should read --a--.
Line 66, "the" should read --said--.

UNITED STATES PATENT AND TRADEMARK OFFICE
CERTIFICATE OF CORRECTION

PATENT NO. : 5,410,379
DATED : April 25, 1995
INVENTOR(S) : Michio HIROHATA

It is certified that error appears in the above-indentified patent and that said Letters Patent is hereby corrected as shown below:

COLUMN 19:

Line 2, "the" should read --said--.
Line 7, "unit." should read --system.--.
Line 11, "unit." should read --system.--.

COLUMN 20:

Line 8, "the" should read --said--.

Signed and Sealed this

Fifth Day of September, 1995

Attest:

BRUCE LEHMAN

Attesting Officer          Commissioner of Patents and Trademarks